United States Patent [19]

Umeda et al.

[11] 4,122,770
[45] Oct. 31, 1978

[54] SERIES PRINTER

[75] Inventors: Shoji Umeda, Kobe; Akio Yoshikawa, Takasago, both of Japan

[73] Assignee: Yamato Scale Company, Ltd., Japan

[21] Appl. No.: 788,837

[22] Filed: Apr. 19, 1977

[30] Foreign Application Priority Data

Apr. 23, 1976 [JP] Japan .............................. 51/51697[U]
Mar. 10, 1977 [JP] Japan .............................. 52/29248[U]

[51] Int. Cl.² .............................................. B41J 1/22
[52] U.S. Cl. .................................... 101/93.19; 101/99
[58] Field of Search ............... 101/93.18, 93.19, 93.22, 101/99, 110, 95; 197/55, 18, 49

[56] References Cited

U.S. PATENT DOCUMENTS

| | | | |
|---|---|---|---|
| 2,668,870 | 2/1954 | Ridler ............................ | 101/93.19 X |
| 3,199,650 | 8/1965 | Brown et al. ................... | 101/93.19 X |
| 3,296,960 | 1/1967 | Felcheck et al. ................. | 101/93.22 |
| 3,442,364 | 5/1969 | Ragen ............................ | 101/93.19 X |
| 3,838,638 | 10/1974 | Clary ............................. | 101/99 X |
| 3,954,054 | 5/1976 | Busch ............................. | 101/93.18 |
| 3,973,486 | 8/1976 | Pylant ............................ | 101/93.19 |
| 3,998,312 | 12/1976 | Fujimi et al. .................... | 101/93.19 |

*Primary Examiner*—Edward M. Coven
*Attorney, Agent, or Firm*—Eugene E. Geoffrey, Jr.

[57] ABSTRACT

A series printer for printing selected indicia or type on a strip of paper wherein the indicia are carried by a rotating drum which rotates in synchronism with a pulse generator identifying specific indicia as they pass through a printing position, a ratchet and pawl operated in synchronism with said drum for intermittantly moving a paper strip through the printing position and in spaced relationship to the drum, pulses produced by an indicia or type signal generator are compared with the identifying pulses and actuates a printing hammer at the printing position when the two sets of pulses are identical to print a specific indicia on the paper, actuation of the printing hammer being prevented during movement of the paper.

3 Claims, 11 Drawing Figures

SERIES PRINTER

This invention relates to a series printer, which is preferably applicable to such equipment as price counting balances, cash registers and table counters for automatically printing calculated numerical data supplied from arithmetic units of the equipment on a small slip of paper such as label or ticket.

The most popular data printer w hich has been used in this kind of equipment is a parallel printer, which includes a type drum having a plurality of rows of type around it, each row corresponding to each place or digit of the numerical date to be printed, and a plurality of printing hammers facing, respectively, the type rows. Although the parallel printer has an inherent advantage of high printing speed since it can print a plurality of digits at the same time or within a single turn of the type drum, it has besides such disadvantages that is impossible to print data consisting of digits more than the designed number of the type rows and that, if one intends to increase the number of places or digits ehich can be printed, he must make the type drum larger and increase the number of printing hammers correspondingly, thereby rendering the printer itself larger, heavier and more costly. Accordingly, this type of printer has been limited in its use to printing data having a few places or digits.

In order to avoid the abovementioned disadvantages of the parallel printer, a series printer had been proposed at the sacrifice of printing speed. The series printer includes a type drum having essentially a single row of type and a single printing hammer facing thereto. The type drum is rotated continuously and a printing medium such as paper is moved continuously in synchronism with the rotation of the type drum between the type drum and the printing hammer. In this type of printer, the digits at respective places are printed one by one, that is, one digit per one turn of the type drum. Accordingly, the printing speed has been much reduced as compared with the parallel printer, but the printer itself, and consequently, the aforementioned equipment incorporating the such printer, has become very small, compact and cheap.

However, such prior art series printers have still had such disadvantages that some difficulty is encountered in manufacture of the type drum due to required successive positional deviation or shift of the type on the drum and that some blur appears in the printed digits due to high speed passing each other of the rotating type drum and the moving printing medium, which have both resulted from continuous movement of the printing medium.

Accordingly, an object of this invention is to provide an improved series printer from which the abovementioned disadvantages have been removed by moving the printing medium intermittently in synchronism with the continuous rotation of the type drum.

According to this invention, the series printer comprises a type drum having a plurality of types on the periphery and being fixed to a shaft for continuous rotation, a pulse generating device interlocked with said shaft for generating pulses in response to the respective passage of a predetermined printing position by the types, a printing hammer facing at said printing position to said type drym, a device for counting said pulses to discriminate the types passing said printing position and generating a type signal representing each type, a device for generating a printing signal designating a type to be printed, a hammer driving device for comparing said type signal and printing signal and, when coincidence is obtained therebetween, actuating said printing hammer and a printing paper feeding device for feeding a printing paper through said printing position. The paper feeding device comprising a feed roller and a ratchet mechanism interlocked with said shaft of the type drum for providing said feed roller with intermittent rotation, and means of inhibiting operation of said hammer during rotation of said feed roller are also provided.

Other objects and features of this invention will be described in detail hereinunder with reference to the accompanying drawings.

In the drawings:

FIG. 1 is a perspective view representing a mechanical portion of an embodiment of the device of this invention;

FIGS. 2a and b are diagrams representing a positional relationship of type on the type drum and slits in a pulse generating disc of the device of FIG. 1;

Figure 5A:
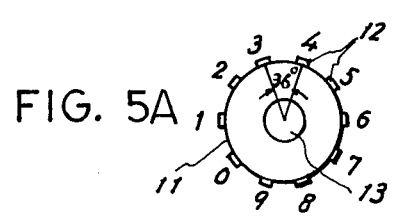
Figure 4:
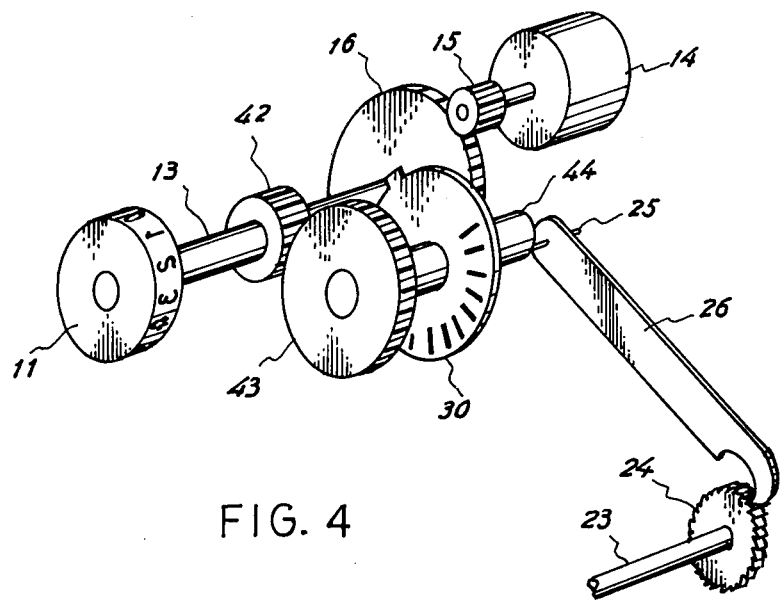
FIG. 4 is a perspective view representing a mechanical portion of another embodiment of the device of this invention.
Figure 7:
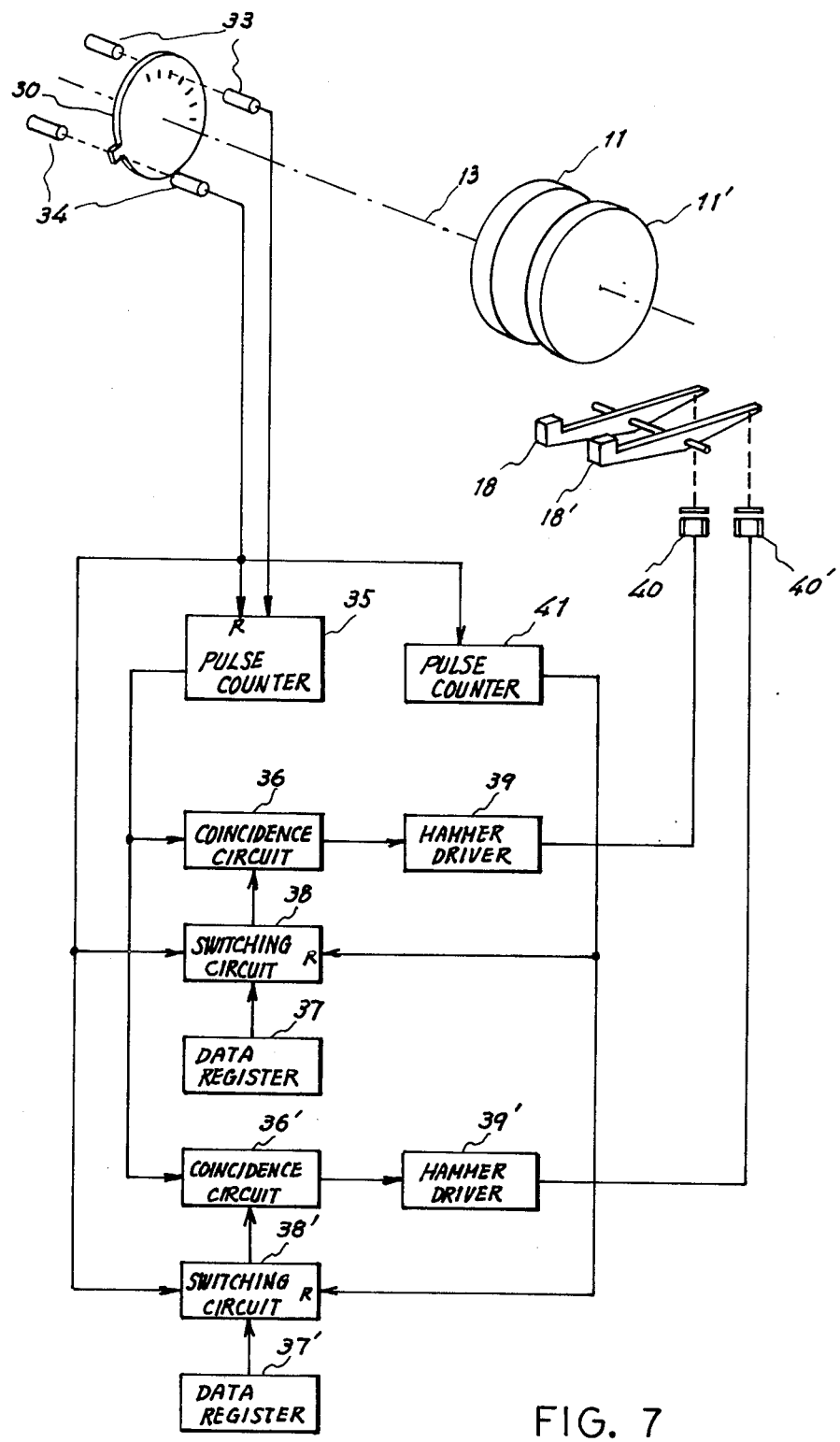

FIGS. 5a and b and 6a, b and c are diagrams representing two embodiments of type drum and pulse generating disc which are applicable to the embodiment of FIG. 4; and FIG. 7 is a block diagram representing a further embodiment of the device of this invention.

Throughout the drawings, like numerals are given to corresponding structural components.

Figure 1:
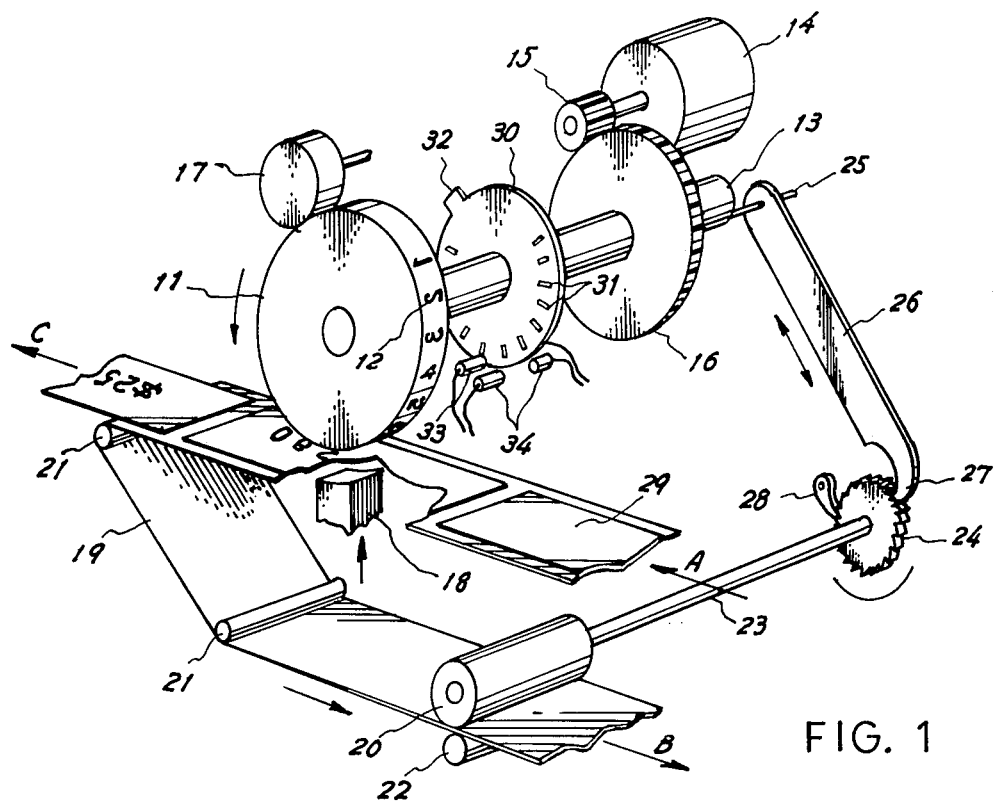

Referring to FIG. 1, provided is a mechanical portion of a preferred embodiment of this invention which is incorporated with a price counting balance as described in U.S. Pat. No. 3,789,202, for instance, and can print the price of a weighed article on a small label which is to be affixed to the article.

A type drum 11 having a plurality of types 12 formed on its periphery is fixed on a shaft 13 and driven in arrow direction at a constant speed by a motor 14 through gears 15 and 16. An ink roller 17 is put in contact with the type drum 11 for feeding printing ink to the types 12. Just under the type drum 11, disposed is a printing hammer 18 which is arranged to jump up and down under control of a hammer driving device as described later.

A base strip 19, which is preferably made of paper and coated with paraffin or wax and has a file of small labels 29 affixed temporarily thereon, is fed by a feed roller 20 from an adequate source (not shown) such as a roll in arrow direction A through rollers 21 toward arrow direction B, passing between the type drum 11 and the printing hammer 18, with the aid of a pinch roller 22. The feed roller 20 is fixed to an end of a driving shaft 23 having a ratchet wheel 24 fixed thereto at the other end.

A crank pin 25 which is parallel to the axis of the shaft 13 is fixed eccentrically thereto and an end of crank 26 is pivoted thereon. The other end of the crank 26 has a driving nail 27 which meshes with the ratchet wheel 24, so that the ratchet wheel 24 is rotationally driven by a predetermined angle by the driving nail 27 and, consequently, the base strip 19 is moved in the arrow direction by a corresponding distance every rotation of the shaft 13. The abovementioned driving mechanism is designed and adjusted previously so that this distance precisely corresponds to the pitch or interval of the printed characters on the labels 29. The numeral 28 denotes a reversion stopper nail of the ratchet mechanism.

Figure 2A:
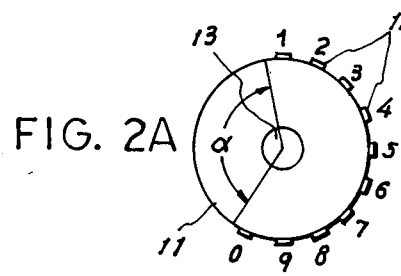

In this embodiment, 10 types 12 of numberals "1", "2", "3", ... "9" and "0" are disposed on the periphery of the type drum 11 at equal intervals, as shown in FIG. 2(a). As a characterized feature of this embodiment, a central angle $\alpha$ is left between the first type "1" and the last type "0" and no type is disposed within this central angle $\alpha$. The magnitude of this central angle $\alpha$ and the angular relationship between the type drum 11 and the crank pin 25 on the shaft 13 is previously fixed so that the driving nail 27 of the crank 26 drives the ratchet wheel 24 only while the central angle $\alpha$ faces to the printing hammer 18. In other words, the strip 19 moves during the time for which the angle $\alpha$ faces to the printing hammer 18 and stands still while any type 12 faces thereto.

Figure 2B:
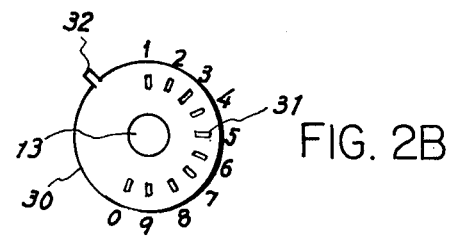

On the shaft 13, also fixed is a circular disc 30 having a plurality of circularly arranged slits 31 and a peripheral projection 32. As shown in FIG. 2(b), the slits 31 are arranged at the same angular positions as the types 12 on the type drum 11. A photoelectric sensing device 33 consisting of a light source and a photocell is disposed across the path of the slits 31 and another similar sensing device 34 is disposed across the path of the projection 32, so that the sensing devices 33 and 34 produce pulses in response to the respective slits 31 and the projection 32, respectively, passing therethrough. The angular positions of both sensing devices 33 and 34 are so determined that each slit 31 passes through the sensing device 33 at the same time as the corresponding type 12 passing through the printing position and that the projection 32 passes through the sensing device 34 before the first slit "1" passes through the sensing device 33 but after the last slit "0" passes therethrough. The output pulses of both sensing devices 33 and 34 are processed as follows.

Figure 3:
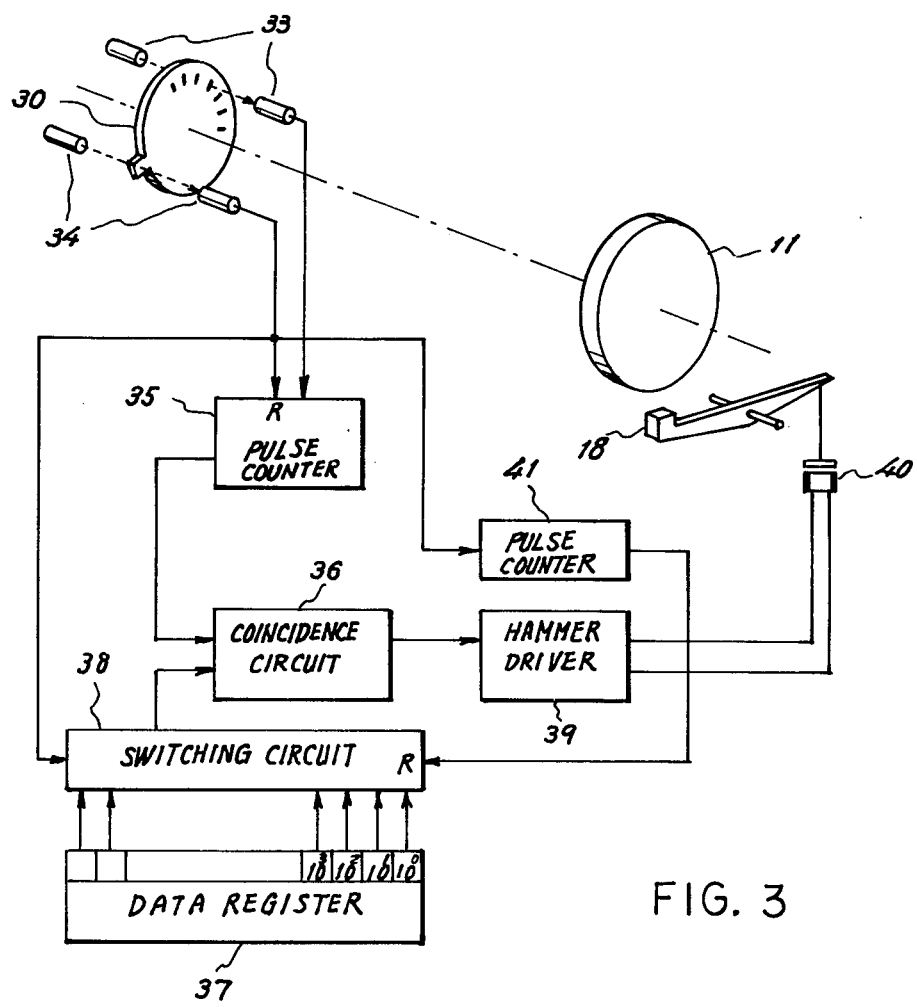
FIG. 3 is a block diagram representing an electrical portion of the device of this invention.

Referring to FIG. 3, the pulses produced by the sensing device 33 are applied to a pulse counter 35 and the count output of the counter 35 is applied to one input of a coincidence circuit 36. The pulses produced by the sensing device 34 are applied also to the counter 35 as its reset pulses. Due to the aforementioned positional relationship, the counter 35 is reset once a rotation of the shaft 13 and produces a count corresponding to the type 12 in the printing position. For example, the counter produces "5" count when the type "5" is in the printing position.

On the other hand, a numerical data to be printed is supplied from the incorporated price counting balance (not shown) as described in the aforementioned United States patent specification to a data register 37 and stored temporarily therein. This data is, in turn, supplied to a switching circuit 38 and scanned from the lowest place or first digit to the highest place or last digit under control of the pulses from the sensing device 34. Thus, the numerical values of the respective places or digits are sequentially supplied in coded form from the data register 37 through the switching circuit 38 to the coincidence circuit 36 in synchronism with rotation of the shaft 13.

When both inputs coincide with each other, the coincidence circuit 36 produces a pulse which is supplied to a hammer driver circuit 39. In response to this coincidence pulse from the coindicence circuit 36, the hammer driver circuit 39 supplies a current to an electromagnet 40 coupled to the printing hammer 18 to drive it against the type drum 11. Thus, a numeral corresponding to the digit of the data register 37 which is now coupled through the switching circuit 38 to the coincidence circuit 36 is printed on the label 29.

The pulse produced from the sensing device 34 is also coupled to a pulse counter 41 which is preset with the number of digits or places to be printed. The counter 41 produces a pulse upon completion of the counting this number, and of this pulse is coupled to the switching circuit 38 as its reset pulse. Accordingly, after completion of the switching circuit 38 the data register 37 returns to the first place or digit $10°$ for printing the next numerical data on the next label 29. The reset pulse from the counter 41 may be used also for disabling the hammer driver circuit 39 or the type drum driving mechanism such as the motor 14. After completion of printing, the printed label 29 may be peeled off from the base strip 19 as shon by arrow C in FIG. 1 and utilized on the article.

FIG. 4 shows another embodiment of mechanical portion of the device of this invention. In this embodiment, the type drum 11 has a plurality of types 12 on its full periphery at equal intervals as shown in FIG. 5(a). Therefore, the diameter of the type drum can be significantly reduced as compared with the embodiment of FIG. 1 and this results in a special advantage in case of printing on small-sized labels 29 as easily understood.

Figure 5B:
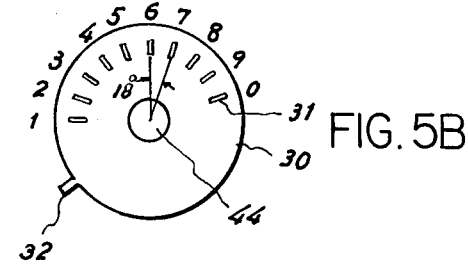

The rotation of the main shaft 13 having the type drum 11 is transmitted through gears 42 and 43 to a second shaft 44 to which slit disc 30 and crank pin 25 are fixed. In this embodiment, therefore, the ratchet mechanism is coupled directly to the second shaft 44, but not the main shaft 13 as in the case of FIG. 1. The gear ratio of the gears 42 and 43 is selected so that the speed of rotation of the second shaft 44 is halved with respect to the main shaft 13, and the angular positions of the slits 31 in the disc 30 are also halved with respect to those of the types 12 on the type drum 11 as shown in FIG. 5(b). In case of 10 types 12, for example, the angular interval of the types is 36° and that of the slits is 18°, as shown. Accordingly, the rate of transition of the types 12 becomes coincident with that of the slits 31 as in the case of FIG. 1. The disc 30 is also provided with a projection 32 and incorporated with two photoelectric sensing devices 33 and 34, which are omitted from FIG. 4 for clarification, in the same positional relationship as described in conjunction with FIG. 1.

As readily understood from the above description, the successive rotations of the type drum 11 correspond alternatingly to the slitted semicircle and unslitted semicircle of the circular disc 30 and the central angle $\alpha$ of FIG. 2(a) corresponds to every other full rotation of the type drum 11 of FIG. 5(a). Accordingly, in this embodiment, the mechanism is arranged so that the printing operation is carried out during one rotation of the type drum 11 and the printing is moved by one digit interval during the next rotation thereof. The same electrical arrangement as FIG. 3 is also applicable as it is to the embodiment.

Figure 6A:
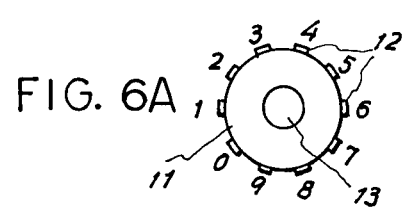
Figure 6B:
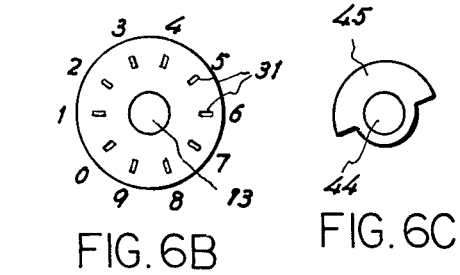
Figure 6C:

As to the mechanical arrangement of the embodiment of FIG. 2, various modification may be realized. The shaft 44 may be first driven by the motor 14 and then coupled to the shaft 13 through gears. The slit disc 30 may be fixed to the main shaft 13. In this case, however, the slits 31 are arranged on the disc 30 in the same angular positions as the types 12 on the drum 11 as shown in FIGS. 6(a) and 6(b), and a shutter plate 45 as shown in FIG. 6(c) is attached to the shaft 44. The shutter plate 45 is incorporated with a photoelectric sensing device (not shown) for sensing a half rotation of the shaft 44, that is, every other rotation of the shaft 13. By using the output from this sensing device to disable the hammer driver circuit 39 (FIG. 3), the same operation as in the case of FIG. 4 is obtained. In this case, moreover, the projection 32 of the disc 30 and co-operating photoelectric sensing device 34 may be omitted by utilizing the leading edge of the pulse produced by the shutter plate 45 for the same use as the pulse produced by the sensing device 34 in co-operation with the projection 32.

Although, in the above embodiments, the type drum 11 is shown to carry only 10 numeral types "1", "2", . . . "9" and "0", it can carry not only these numeral types but also other types of normal characters such as "A", "B", etc., and/or any symbol such as "$", "gm", "." (point), ",", (comma), etc., as occasion demands. In this case, appropriate digital codes such as "11", "12", etc., may be given to these characters and symbols so as to provide correspondence to the count output of the pulse counter 35.

Furthermore, though the above embodiments were described in conjunction with the devices which have only one type drum 11 and can print only one file of characters, this invention can be applied to a device which can print two or more files of characters. Such a device is useful to print the weight of article, as well as its price, on a same label 29 in cooperation with the aforementioned price counting balance, as a preferred example. In the embodiment of FIG. 7, an additional type drum 11' which is the same in diameter as the type drum 11 but carries a different set of types is fixed to the shaft 13 and driven at the same speed as the drum 11. Therefore, the both drums 11 and 11' may be formed in a single integral body if necessary. Pulse generating slit disc 30, photoelectric sensing devices 33 and 34, pulse counters 35 and 41, coincidence circuit 36, data register 37, switching circuit 38, hammer driver circuit 39, electromagnet 40 and printing hammer 18 are arranged the same as in the case of FIG. 3 and operate similarly to effect printing with the type drum 11. For the type drum 11', however, coincidence circuit 36', data register 37', switching circuit 38', hammer driver circuit 39', electromagnet 40' and printing hammer 18' are added and arranged similarly to the corresponding components for the type drum 11. As will be understood from the drawing, the additional type drum 11' and co-operating printing hammer 18' can print another file of characters independently of the type drum 11 and printing hammer 18 but in synchronism therewith, if separate data to be printed is supplied from the additional data register 37' to the coincidence circuit 36' which is supplied with the count output of the pulse counter 35.

Although the above embodiments were described in co-operation with a price counting balance, it is a matter of course that the device of this invention can operate incorporated with other equipment such as a table counter and other calculators. In such cases, the base strip 19 may be conventional recording medium such as paper strip.

What is claimed is:

1. A series printer, comprising a type drum having a plurality of radially spaced coplanar types on the periphery and being fixed to a shaft for continuous rotation, a pulse generating device interlocked with said shaft for generating pulses in response to the respective passage of said types through a predetermined printing position, a printing hammer facing said type drum at said printing position, said pulse generating device including a type signal generator for counting said pulses to discriminate the type signal representing each type, a printing signal generator for generating a printing signal designating a type to be printed, hammer actuating means including a coincidence circuit connected to said type signal generator and said printing signal generator for comparing said type signals with the printing signal and producing a coincidence signal when the type signal is identical to the printing signal, said coincidence signal actuating said printing hammer, and printing paper feeding means feeding a printing paper through said printing position, said printing paper feeding means comprising a feed roller and a ratchet drive mechanism having a pawl coupled with and reciprocated by rotation of the shaft of said type drum and providing said feed roller with intermittent rotation, and means disabling the hammer actuating means during rotation of said feed roller.

2. A series printer according to claim 1 wherein said paper feeding means includes a ratchet mechanism coupled to said shaft through a speed reducing gear train whereby said ratchet mechanism drives said paper during every other rotation of the type drum and said disabling means comprises means on said type signal generator to prevent the generation of type signal pulses while the paper is being moved.

3. A series printer, according to claim 2, wherein said type drum has a central angle portion having no type included therein, said ratchet mechanism is coupled directly to said shaft of said type drum and arranged to perform one cycle of ratchet operation, and the magnitude and orientation of the central angle of said central angle portion is selected so that the time taken by said portion for passing said printing position includes completely the time of operation of said ratchet mechanism for driving said feed roller.

* * * * *